US009800561B2

United States Patent
Poornachandran et al.

(10) Patent No.: US 9,800,561 B2
(45) Date of Patent: Oct. 24, 2017

(54) SECURE SHARING OF USER ANNOTATED SUBSCRIPTION MEDIA WITH TRUSTED DEVICES

(71) Applicant: Intel Corporation, Santa Clara, CA (US)

(72) Inventors: Rajesh Poornachandran, Portland, OR (US); Saurabh Dadu, Tigard, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/534,476

(22) Filed: Nov. 6, 2014

(65) Prior Publication Data

US 2016/0134602 A1    May 12, 2016

(51) Int. Cl.
*H04L 29/06*    (2006.01)
*G06F 17/24*    (2006.01)
*G06F 21/12*    (2013.01)

(52) U.S. Cl.
CPC .......... *H04L 63/062* (2013.01); *G06F 17/241* (2013.01); *H04L 63/0428* (2013.01); *G06F 21/12* (2013.01)

(58) Field of Classification Search
None
See application file for complete search history.

(56) References Cited

U.S. PATENT DOCUMENTS

| | | | | |
|---|---|---|---|---|
| 2002/0184492 A1* | 12/2002 | Hori | ........................ | G06F 21/10 713/158 |
| 2006/0165233 A1* | 7/2006 | Nonaka | .................... | G06F 21/10 380/44 |
| 2006/0239451 A1* | 10/2006 | Evans | ..................... | G06F 21/10 380/44 |
| 2007/0294178 A1* | 12/2007 | Pinder | ..................... | G06F 21/10 705/57 |
| 2009/0150553 A1* | 6/2009 | Collart | .............. | G06F 17/30017 709/229 |
| 2010/0161974 A1* | 6/2010 | Lee | ......................... | G06F 21/10 713/162 |
| 2012/0166545 A1* | 6/2012 | Alexandrov | ........... | G06Q 10/10 709/205 |

(Continued)

*Primary Examiner* — Malcolm Cribbs
(74) *Attorney, Agent, or Firm* — Grossman, Tucker, Perreault & Pfleger, PLLC (57) ABSTRACT

Generally, this disclosure provides systems, methods and computer readable media for secure sharing of user annotated subscription media content with trusted devices. The shared content may include user specified snapshots of the media along with user supplied annotations. The system may include a host processor configured to arrange a secure session with a server and to receive the subscription media content from the server in an encrypted format. The system may also include a trusted execution environment (TEE) comprising a secure processor and secure storage configured to decrypt and store the media content, based on a content encryption key obtained from the server. The system may further be configured to: receive a snapshot frame request and annotations from the user; generate a composite image of the snapshot and an overlay including the annotations; and encrypt the composite image for sharing with other users.

29 Claims, 8 Drawing Sheets (56) References Cited

U.S. PATENT DOCUMENTS

| | | | |
|---|---|---|---|
| 2012/0166921 A1* | 6/2012 | Alexandrov | G06F 17/212 |
| | | | 715/202 |
| 2012/0166952 A1* | 6/2012 | Alexandrov | G06Q 10/101 |
| | | | 715/730 |
| 2012/0287231 A1* | 11/2012 | Ravi | H04N 7/148 |
| | | | 348/14.12 |
| 2014/0095890 A1* | 4/2014 | Mangalore | G06F 21/60 |
| | | | 713/189 |
| 2014/0189354 A1* | 7/2014 | Zhou | G06Q 30/02 |
| | | | 713/168 |
| 2014/0205099 A1* | 7/2014 | Christodorescu | H04L 9/0819 |
| | | | 380/278 |
| 2014/0214920 A1* | 7/2014 | Wong | H04N 21/47202 |
| | | | 709/203 |
| 2015/0058587 A1* | 2/2015 | Wang | G06F 21/72 |
| | | | 711/163 |
| 2015/0269229 A1* | 9/2015 | Shenoy | G06F 17/30525 |
| | | | 715/233 |
| 2016/0105388 A1* | 4/2016 | Bin Mahfooz | G06F 3/04817 |
| | | | 709/206 |

* cited by examiner

SECURE SHARING OF USER ANNOTATED SUBSCRIPTION MEDIA WITH TRUSTED DEVICES

FIELD

The present disclosure relates to secure sharing of subscription media content, and more particularly, to secure sharing of subscription media content and user annotations with trusted devices.

BACKGROUND

Subscription media content, for example an audio/video stream of a sporting event, is typically subject to copyright protections that prohibit subscribers from sharing any or all portions of the content with other people. Security systems, such as Digital Rights Management (DRM) systems, may be employed by the subscription content providers to prevent such sharing, even if the parties involved in the sharing are all subscribers.

One illustrative scenario is where a group of friends are watching the same live sporting event, for example on televisions, at different physical locations. During the game, one of them may have a comment about a particular play or actions of a player that he would like to share with the group. That person's options for doing this are generally limited to texting, calling, emailing or posting the comment on a social media site, with no ability to include the relevant subscription content along with the message. This limits the quality of the viewing and sharing experience for the group, even though all group members may be legitimate content subscribers.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for secure sharing of subscription media content with trusted devices. The system may receive the subscribed media content from a content server, for example in an encrypted form, after authentication of the user and/or receiving device by a license server. The system may include a trusted execution environment (TEE) with a secure processor and secure memory to decrypt and securely store the subscribed media content. The system may be configured to play the media content and allow the user to specify snapshot frames and provide annotations to accompany the snapshots. The annotations may include, for example, text, drawings, labels and/or pictures. The system may further be configured to overlay the annotations on the snapshots and securely share them with other trusted devices associated with other subscribed users.

Figure 1:
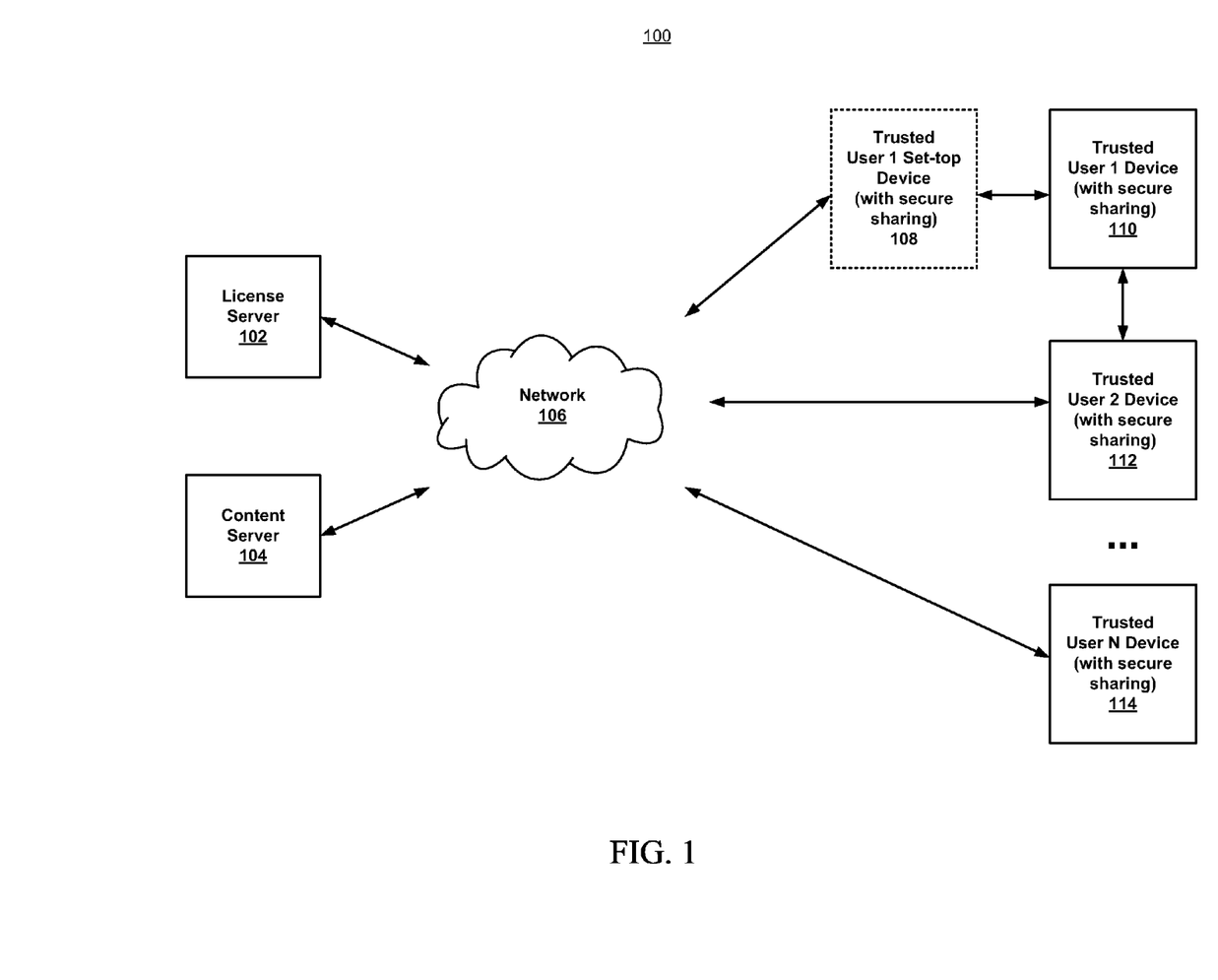
FIG. 1 illustrates a top level system diagram of an example embodiment consistent with the present disclosure.

FIG. 1 illustrates a top level system diagram 100 of one example embodiment consistent with the present disclosure. A license server 102 and a media content server 104 are shown connected to a network 106. The content server 104 may be configured to provide media content including premium or subscription media content, such as for example, sporting events. The license server 102 may be configured to authenticate subscribed users and/or devices that are licensed to receive the subscription media content. Any number of trusted user devices 110, 112, 114 may also be connected to network 106. The trusted user devices may be configured for secure sharing of the subscription media, as described herein. The secure sharing may comply with Digital Rights Management DRM requirements. In some embodiments, a user may have both a set-top device 108, (e.g., for use with a television), and a mobile platform 110 configured to function in coordination with each other to provide secure sharing of subscription media. Functional elements of the system, as described below, maybe incorporated in either or both of the set-top box 108 and the user device 110, as appropriate. In some embodiments the license server 102 and the content server 104 may be incorporated in the same server platform and may sometimes be referred to herein simply as "server" for convenience.

Figure 2:
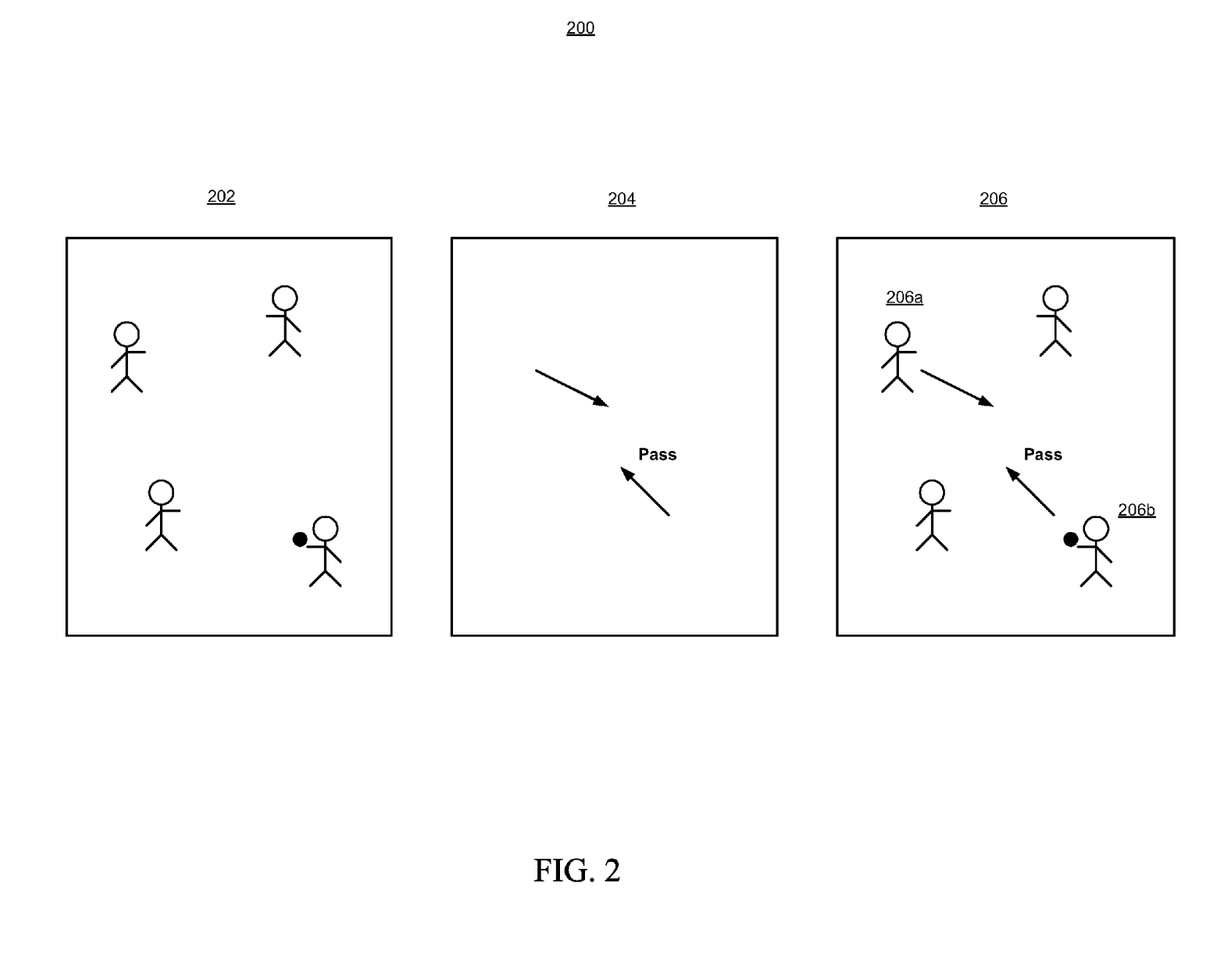
FIG. 2 illustrates an example image composition in accordance with an embodiment consistent with the present disclosure.

FIG. 2 illustrates an example image composition 200 in accordance with an embodiment consistent with the present disclosure. A simplified illustration of a snapshot 202 is shown to include, for example, four players involved in a sporting event. The user may wish to make a comment, for example about how one of the players should have moved into a gap to receive the ball. This may be expressed as shown in the simplified example illustration of user annotations 204 which includes arrows and a text label "Pass." A composite overlay 206 is shown where the snapshot 202 and the user annotations 204 are overlaid into a composite image which provides a convenient visual indication of the annotating user's intention that player 206a should move down and to the right while player 206b should pass the ball toward that location. In some embodiments, annotations may include any type of visual or graphical information that may be entered by the user, including, for example, text, drawings, labels, pictures and/or clipart. It will be understood, of course, that the methods and systems described herein are not limited to media content that depicts sporting events and may be applied to any media content including television shows, movies, etc.

The composite overlay image 206 thus includes a mixture of subscription content (e.g., the snapshot), which need to be handled securely, and user annotations. The composite overlay image 206 must therefore also be handled securely during both processing and sharing/distribution.

Figure 3:
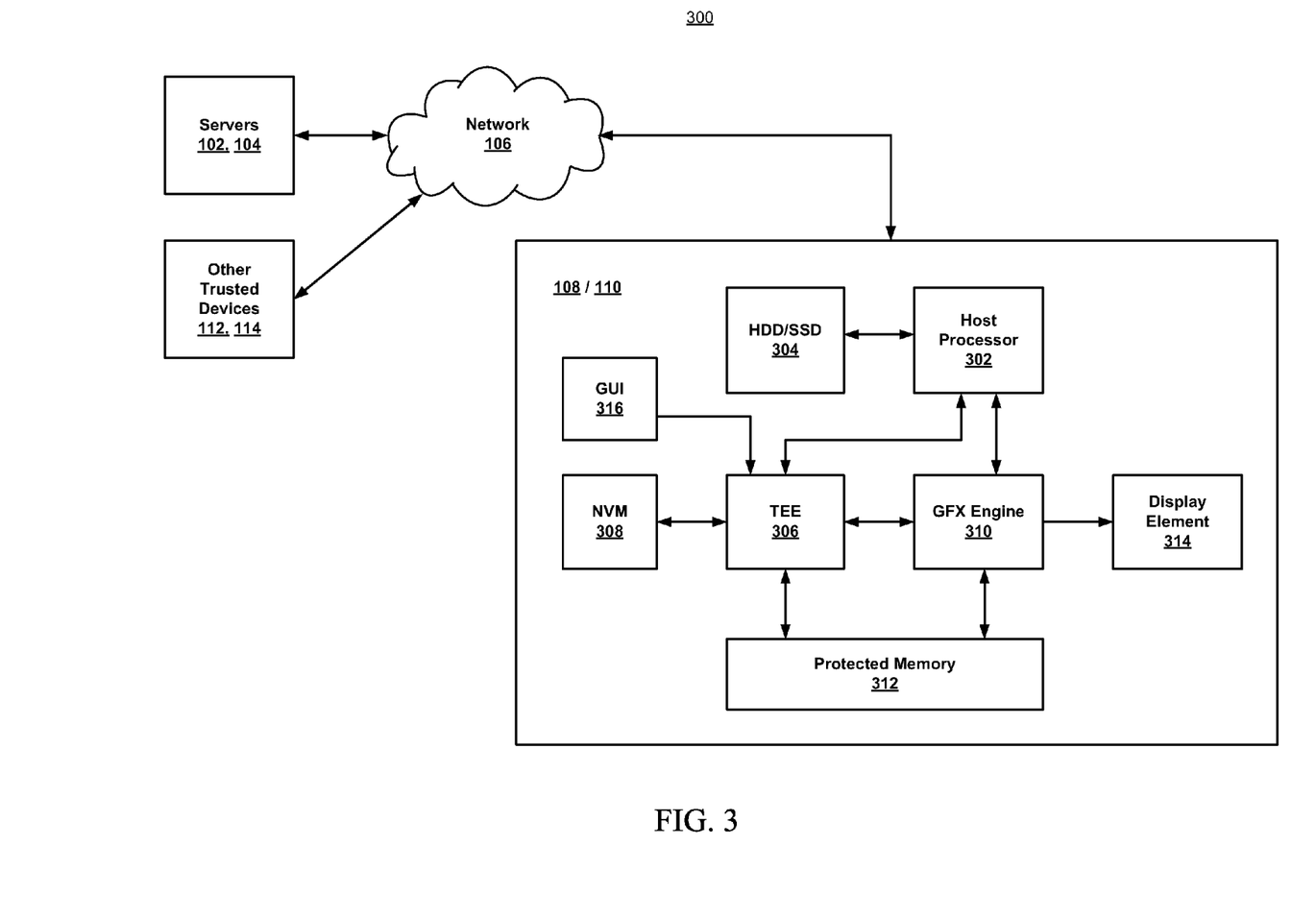
FIG. 3 illustrates a block diagram of one example embodiment consistent with the present disclosure.

FIG. 3 illustrates a block diagram 300 of one example embodiment consistent with the present disclosure. The trusted device 108/110 is shown to include a host processor 302, a storage device 304, a graphics (GFX) engine 310, a display element 314, a platform trusted execution environment (TEE) 306, non-volatile memory 308, a graphical user interface (GUI) module 316 and protected memory 312. In some embodiments, the storage device 304 may be configured as a hard disk drive (HDD) or a solid state drive (SSD). The trusted device 108/110 may be a set-top device (e.g., a digital video recorder (DVR) or cable TV decoder), or a computer or mobile platform (e.g., a tablet or smartphone) or a combination thereof.

The host processor 302, which may include one or more processing cores, may be configured to arrange a secure session (secure channel) with the subscription media content server 104 and the platform TEE 306. The host processor 302 may communicate with the network 106 through a network interface (not shown). Arrangement of the secure session may include providing a license token from the TEE 306 to the license server 102 to validate the trusted device 108/110, and obtaining a content encryption key (CEK) from the license server 102 for provision to the platform TEE 306. The host processor 302 may also be configured to receive subscription media content from the content server 104 in an encrypted or otherwise secured format. The encrypted subscription media content may be stored on storage device 304.

The GUI 316 may be configured to receive annotation information from the user and generate an overlay image based on the annotation information. The annotation information may be associated with a frame of the media content, for example as it is being played or streamed to the user. The GFX engine 310 may be configured to composite the media content and the overlay image for rendering on display element 314 and for secure provisioning, over the network 106, to other users/devices 112, 114, as will be described in greater detail below.

Figure 4:
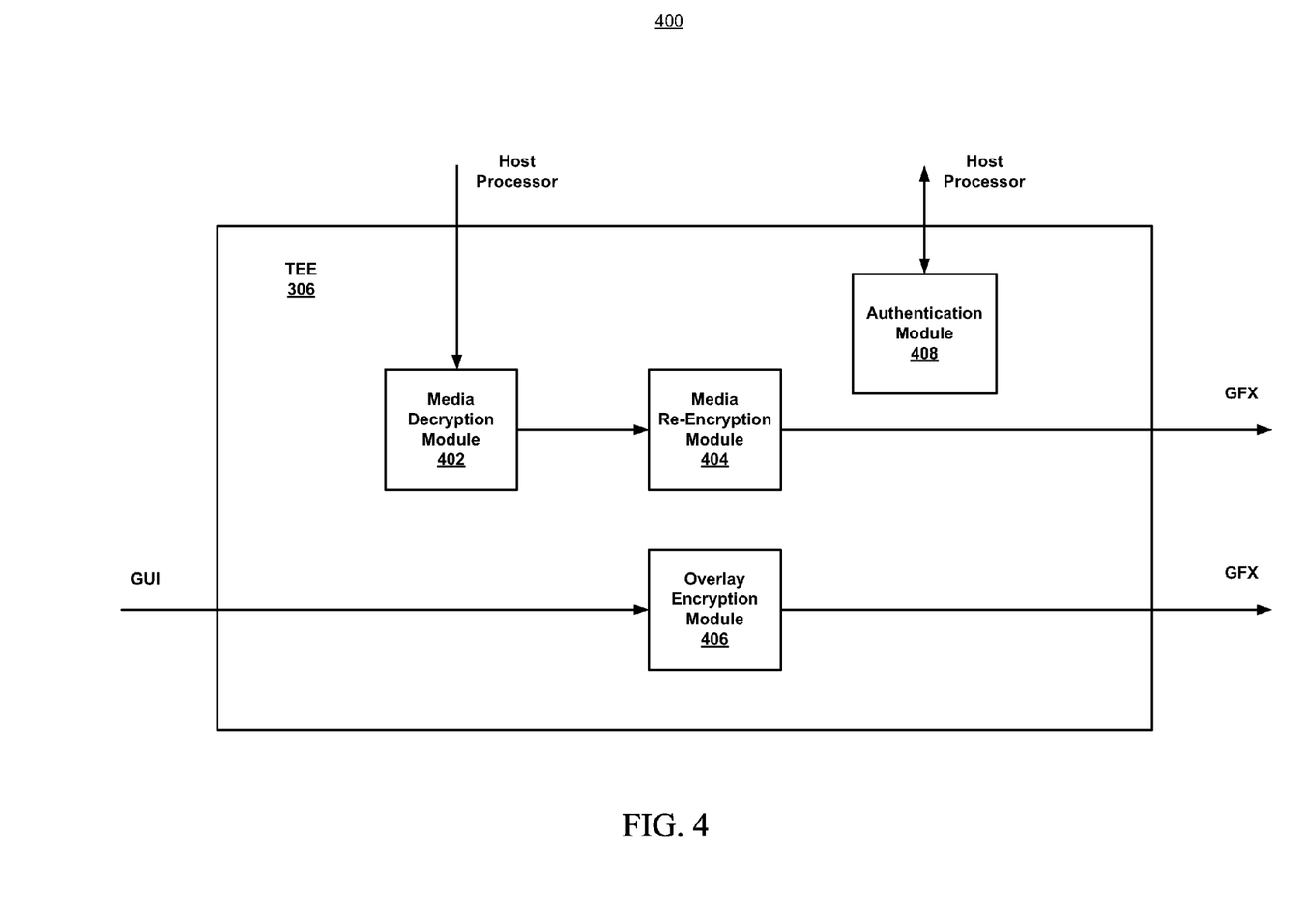
FIG. 4 illustrates a block diagram of another example embodiment consistent with the present disclosure.

FIG. 4 illustrates a block diagram 400 of one example embodiment consistent with the present disclosure. The TEE 306 is shown in greater detail to include an authentication module 408, a media decryption module 402, a media re-encryption module 404 and an overlay encryption module 406. The TEE 306 may include a secure independent processor or co-processor and associated secure storage to perform the functions described herein.

The authentication module 408 may be configured to authenticate the trusted device 108/110 with the license server, for example, by providing a validation key or license token to demonstrate the existence of a valid subscription to the protected media in accordance with a licensing policy enforced by the license server. In some embodiments, a trust anchor (configured to provide the capability for the remote license server to attest/validate the client platform prior to streaming of subscription content) may be provisioned in NVM 308 or other platform hardware by the manufacturer in a manner that is resistant to user tampering. The trust anchor may be used during the authentication/validation process.

The media decryption module 402 may be configured to decrypt and store the subscription media in a protected and/or isolated region of the device (e.g., protected memory 312) that is tamper resistant and not directly accessible by the host processor 302 or other external entities. The decryption may be accomplished using the CEK associated with the subscription media, obtained from the license server 102 after authentication. Media re-encryption module 404 may be configured to re-encrypt the decrypted media prior to transmission to the GFX over a secure channel between the TEE and the GFX. This re-encryption may be performed using a different encryption key, such as, for example a Protected Audio/Video Path (PAVP) key managed by the device.

Overlay encryption module 406 may be configured to obtain the overlay image including user annotations, for example from GUI module 316, and encrypt it prior to transmission to the GFX over a secure channel between the TEE and the GFX. This overlay encryption may also be performed using a different encryption key, such as, for example the PAVP key.

In some embodiments, the TEE and the GFX engine may be hosted on different platforms. For example the TEE may be included in the set-top box 108 while the GFX engine may be included in the user's trusted device (e.g., a mobile platform) 110. The secure channel between the TEE and the GFX may be a local area network (LAN) connection. The encryption performed by modules 404 and 406 may prevent unauthorized access to the protected media content during this transmission.

In some embodiments, the TEE 306 may be configured to provide security and isolation from other entities on the device 108/110 that are outside the TEE, such as, for example, software or applications executing on the host processor 302. The isolation may prevent external entities from exercising control over, or obtaining access to, cryptographic keys, licenses and decrypted media content. In some embodiments, the TEE may comprise separate physical hardware, for example an integrated circuit (IC) that is separate from an IC associated with the host processor 302. In some embodiments, the TEE may comprise a separate controller or processor within an IC that is shared with other components of the device, including, for example, an Intel Converged Security Engine (CSE). In some embodiments, the TEE may comprise a separate domain within a controller or processor that is shared with the device. Various techniques may be employed to securely isolate the TEE including situations where hardware is being shared between the TEE and the device. These techniques may include privileged execution modes associated with the processors, access protection mechanisms associated with memory and/or the use of firmware to prevent unintended access. These may include, for example, use of the Intel Software Guard Extension (SGX), Virtualization Technology Extension (VT-x) or System Management Mode (SMM).

Additional non-volatile memory 308 may be provided to securely store authentication information, cryptographic keys and/or other data that the trusted device needs to maintain within the TEE.

Figure 5:
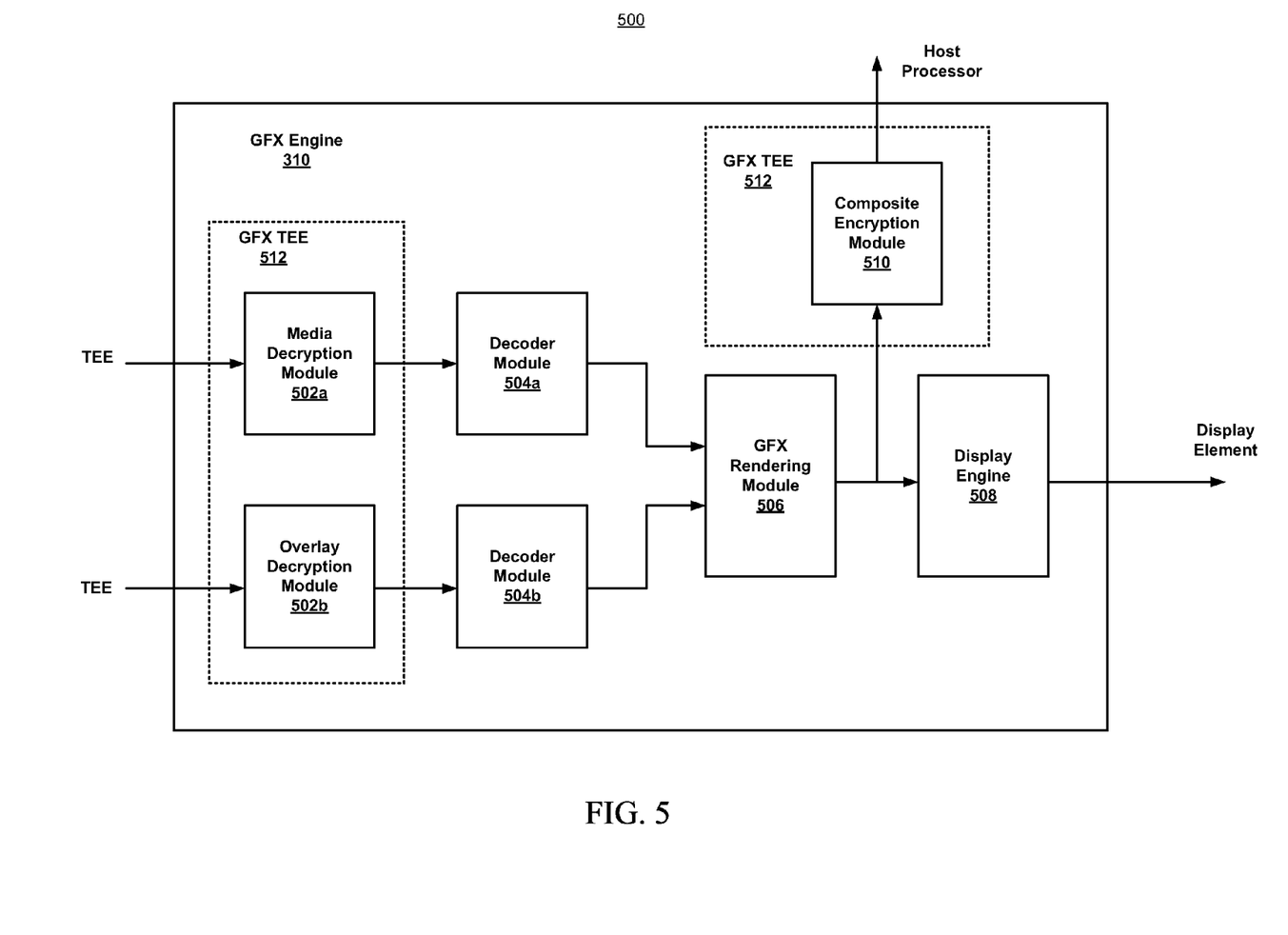
FIG. 5 illustrates a block diagram of another example embodiment consistent with the present disclosure.

FIG. 5 illustrates a block diagram 500 of one example embodiment consistent with the present disclosure. The GFX engine 310 is shown in greater detail to include media decryption module 502a, overlay decryption module 502b, decoder modules 504a/b, GFX rendering module 506, display engine 508 and composite encryption module 510.

The media decryption module 502a may be configured to decrypt the media content provided by the TEE and the overlay decryption module 502b may be configured to decrypt the overlay image(s) provided by the TEE. Decoder modules 504a and 504b may be configured to decode the video from a compressed format, such as, for example, any of the Moving Picture Experts Group (MPEG) formats to a decompressed format. The GFX rendering module 506 may be configured to generate a composite of the decrypted and decoded media with the decrypted and decoded overlay image and to render the composite into frame buffers from which the display engine 508 may drive the display element 314 for viewing by a user of the device.

In some embodiments, the display element 314 may be a television screen or a display element associated with a computer or mobile platform. Multiple playing options may be provided to the user including real-time play, stop (pause or freeze frame), fast forward and rewind operations. These playing options may be controlled by the user, for example, through GUI 316. Additionally, the user may specify the frame of media content to be associated with the annotations, during any of these playing options. The playing option that is in use, as well as a timestamp, may also be captured, for example as metadata, and included with the overlay content. Such information may be useful, for example, to indicate a media segment of particular interest that may be rewound and replayed several times.

While only one overlay channel 502b, 504b is shown in this illustration, for simplicity, in practice any number of overlay channels may be implemented to provide multiple layers of overlay images.

Composite encryption module 510 may be configured to re-encrypt the composite image rendered by module 506 prior to transmission (e.g., through the host processor and/or network interface) to other devices for sharing with other users. In some embodiments, the encryption may be performed using the CEK or a key derived from the CEK. Thus, the content may remain protected, and other users will require an appropriate decryption key to view the content (and overlays) which may be obtained, for example, with a subscription through the license server. In some embodiments, the transmission may be directed to a social media site to facilitate sharing, although the content remains encrypted to restrict viewing to subscribed users on trusted devices.

In some embodiments, the overlay may be encoded as a separate package of metadata or instructions for construction of the overlay. In this way, multiple overlays which may be contributed by multiple users during the sharing process, may be more easily distinguished, separated and/or removed as desired by any particular user. For example, a user may wish to remove the current overlay before adding their own overlay. The associated media snapshot, however, remains secure and may not be otherwise modified The graphics engine (GFX) 310 may be a secure graphics engine working in coordination with the TEE 306 and protected memory 312. In some embodiments, the GFX may include its own TEE 512 to protect, for example, the Media decryption modules 502a, 502b and/or the composite encryption module 510. In some embodiments, the GFX may implement Software Guard Extension (SGX) or other suitable technology, to isolate execution of threads to provide this protection.

In an alternative embodiment, the TEE module 306 may be configured to perform the authentication function (module 408) and provide the CEK to the GFX engine 310. In this embodiment, the GFX 310 may be configured to directly receive the encrypted subscription media content from the host processor and decrypt it locally (in the GFX) using the CEK. In some embodiments, the GUI 316 may be incorporated in the GFX 310.

Figure 6:
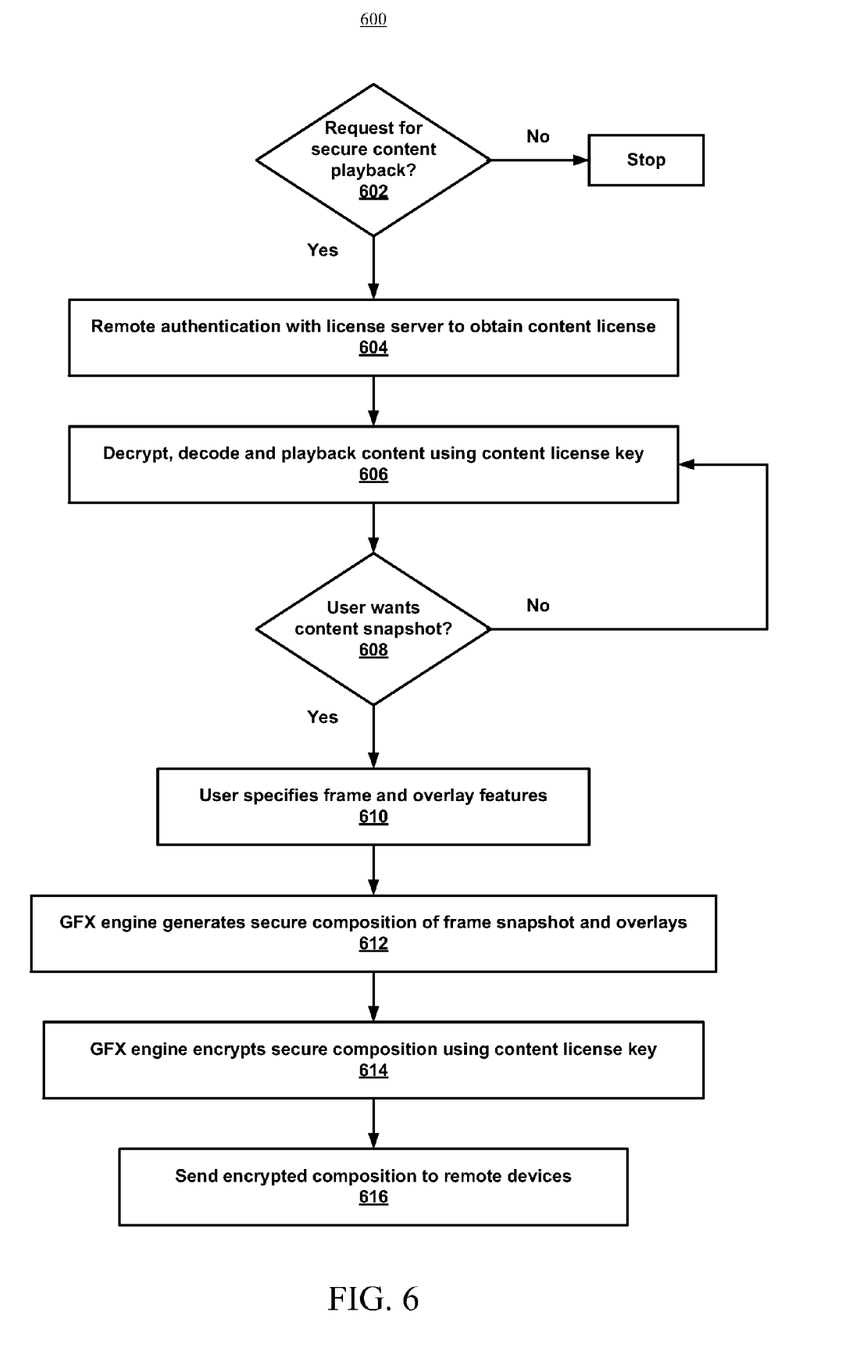
FIG. 6 illustrates a flowchart of operations of one example embodiment consistent with the present disclosure.

FIG. 6 illustrates a flowchart of operations 600 of another example embodiment consistent with the present disclosure. The operations provide a method for secure sharing of user annotated subscription media content. At operation 602, if a request for secure content playback is received from the user, then at operation 604, a remote authentication with the license server is performed to obtain a content license. At operation 606, the secure content is decrypted, decoded and played using a key associated with the content license. A determination is made, at operation 608, as to whether the user wants a snapshot taken at any point during the content playback. If so, then at operation 610, the user specifies a frame for the snapshot and provides any desired overlay features such as text, labels, drawings, etc. At operation 612, a graphics processor (e.g., GFX engine) securely generates a composition of the snapshot frame and the overlay features. At operation 614, the graphics processor encrypts the composition, for example using the content license key. At operation 616, the encrypted composition is transmitted to remote trusted devices for sharing.

Figure 7:
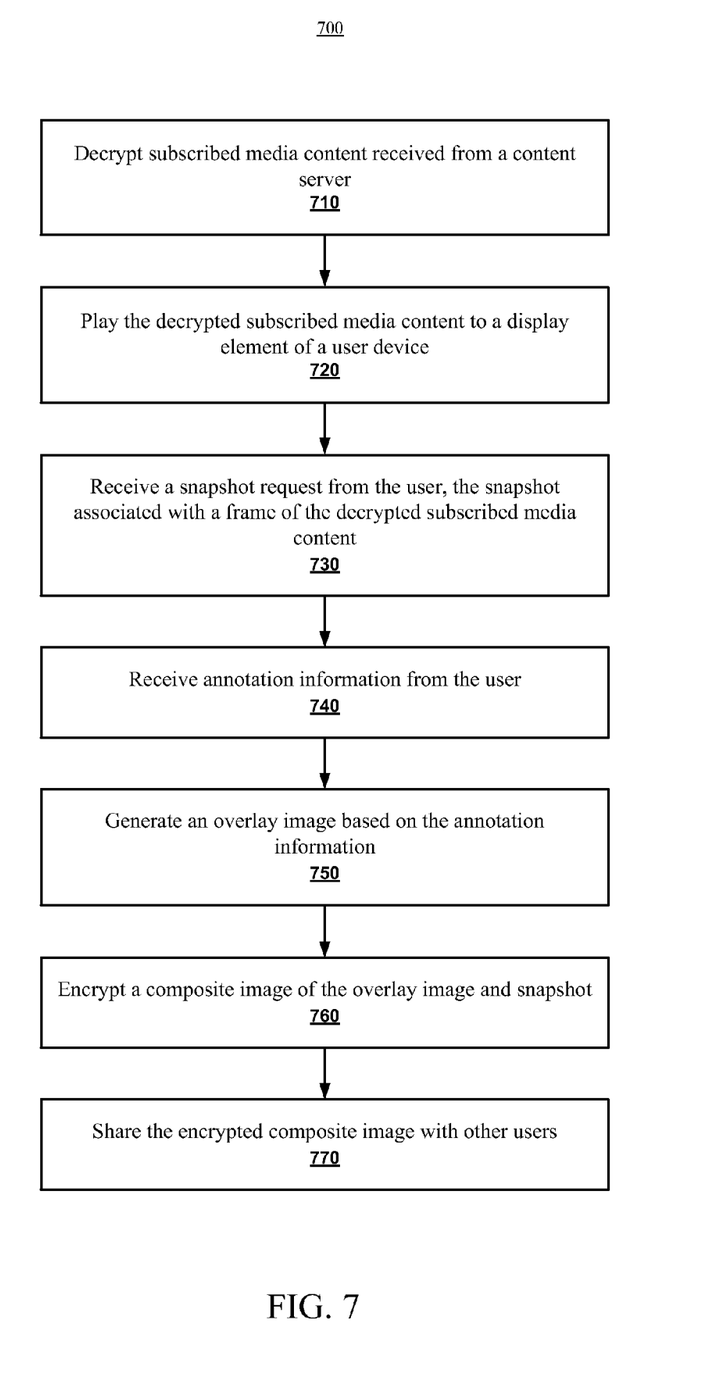
FIG. 7 illustrates a flowchart of operations of another example embodiment consistent with the present disclosure.

FIG. 7 illustrates a flowchart of operations 700 of another example embodiment consistent with the present disclosure. The operations provide a method for secure sharing of subscription media content. At operation 710, subscribed media content, received from a content server, is decrypted. At operation 720, the decrypted subscribed media content is played to a display element of a user device. At operation 730, a snapshot request is received from the user. The snapshot is associated with a frame of the decrypted subscribed media content. At operation 740, annotation information is received from the user. At operation 750, an overlay image is generated based on the annotation information. At operation 760, a composite image of the overlay image and snapshot is generated and encrypted. At operation 770, the encrypted composite image is shared with other users.

Figure 8:
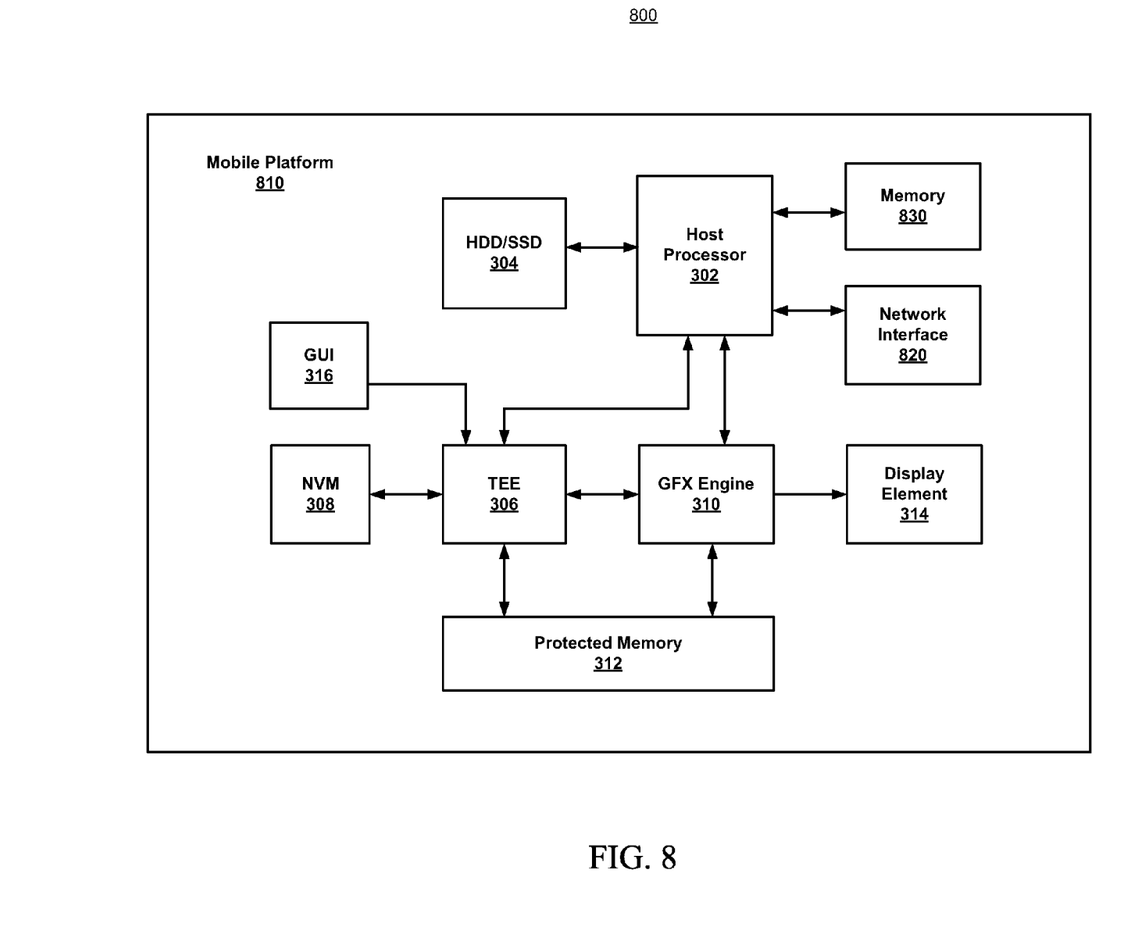
FIG. 8 illustrates a system diagram of a platform of another example embodiment consistent with the present disclosure.

FIG. 8 illustrates a system diagram 800 of one example embodiment consistent with the present disclosure. The system 800 may be a mobile platform 810 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 800 may be a workstation or desktop computer. The device may generally present various interfaces to a user via a display element 314 such as, for example, a touch screen, liquid crystal display (LCD) or any other suitable display type.

The system 800 is shown to include host processor 302 that may further include any number of processors or processor cores and associated memory 830. These processors (or cores) may be any type of processor, such as, for example, a micro-processor, an embedded processor, a digital signal processor (DSP), a network processor, a field programmable gate array or other device configured to execute code. The processors may be multithreaded cores in that they may include more than one hardware thread context (or "logical processor") per core. The memory 830 may be coupled to the host processors. The memory 830 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 810.

System 800 is also shown to include network interface module 820 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 800 is also shown to include a storage device 304, display element 314, graphics engine 310, TEE 306, NVM 308, GUI 316 and protected memory 312 configured to operate as described previously for secure sharing of subscription media content.

It will be appreciated that in some embodiments, the various components of the system 800 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for secure sharing of subscription media content. The following examples pertain to further embodiments.

According to Example 1 there is provided a system for secure sharing of user annotated subscription media content. The system may include: a host processor configured to arrange a secure session with a subscription media server and to receive the subscription media content from the server in an encrypted format; a trusted execution environment (TEE) including a secure processor and secure storage configured to decrypt and store the subscription media content, the decryption based on a content encryption key obtained from the server; a graphical user interface module configured to receive a snapshot frame request of the decrypted media content and associated annotation information from a user of the system; and a secure graphics engine configured to: generate a composite image including the snapshot frame and an overlay image, the overlay image based on the annotation information; and to encrypt the composite image for sharing with other users.

Example 2 may include the subject matter of Example 1, and further including a display element and the secure graphics engine is further configured to play the decrypted media content to the display element.

Example 3 may include the subject matter of any of Examples 1 and 2, and the host processor is further configured to share the encrypted composite image with other users.

Example 4 may include the subject matter of any of Examples 1-3, and the sharing further includes transmitting the encrypted composite image over a network.

Example 5 may include the subject matter of any of Examples 1-4, and the annotation information includes one or more of text, drawings, labels and pictures.

Example 6 may include the subject matter of any of Examples 1-5, and the encryption of the composite image is based on the content encryption key.

Example 7 may include the subject matter of any of Examples 1-6, and the secure graphics engine is further configured to receive the user specified frame during real-time playing of the decrypted media content, during a rewind search of the decrypted media content, during a fast forward search of the decrypted media content or during a pause of the decrypted media content.

Example 8 may include the subject matter of any of Examples 1-7, and the overlay image further includes metadata associated with the playing of the decrypted media content, the metadata indicating one of real-time play, rewind, fast forward or pause.

Example 9 may include the subject matter of any of Examples 1-8, and the secure graphics engine is further configured to stream the decrypted media content to a computing device or mobile platform.

Example 10 may include the subject matter of any of Examples 1-9, and at least a portion of the system is incorporated in a television system.

Example 11 may include the subject matter of any of Examples 1-10, and at least a portion of the system is incorporated in a television system set-top box.

Example 12 may include the subject matter of any of Examples 1-11, and at least a portion of the system is incorporated in a mobile platform.

Example 13 may include the subject matter of any of Examples 1-12, and the mobile platform is one of a smart phone, a smart tablet, a personal digital assistant (PDA), a mobile Internet device (MID), a convertible tablet, a notebook or a laptop computer.

According to Example 14 there is provided at least one computer-readable storage medium having instructions stored thereon which when executed by a processor result in the following operations for secure sharing of user annotated subscription media content. The operations may include: decrypting the subscribed media content received from a content server; playing the decrypted subscribed media content to a display element of a user device; receiving a snapshot request from the user, the snapshot associated with a frame of the decrypted subscribed media content; receiving annotation information from the user; generating an overlay image based on the annotation information; encrypting a composite image of the overlay image and the snapshot; and sharing the encrypted composite image with other users.

Example 15 may include the subject matter of Example 14, and the annotation information includes one or more of text, drawings, labels and pictures.

Example 16 may include the subject matter of any of Examples 14 and 15, and further including the operation of receiving a content encryption key for the subscribed media from a license server based on an authentication of the user device.

Example 17 may include the subject matter of any of Examples 14-16, and the decrypting of the subscribed media content is based on the content encryption key.

Example 18 may include the subject matter of any of Examples 14-17, and the encrypting of the composite image is based on the content encryption key.

Example 19 may include the subject matter of any of Examples 14-18, and the sharing further includes the operation of transmitting the encrypted composite image over a network.

Example 20 may include the subject matter of any of Examples 14-19, and the snapshot request is received during real-time playing of the media content, during a rewind search of the media content, during a fast forward search of the media content or during a pause of the media content.

Example 21 may include the subject matter of any of Examples 14-20, and the playing further includes the operation of streaming the decrypted subscribed media content to a computing device or mobile platform.

Example 22 may include the subject matter of any of Examples 14-21, and the overlay image further includes metadata associated with the playing of the decrypted media content, the metadata indicating one of real-time play, rewind, fast forward or pause.

According to Example 23 there is provided a method for secure sharing of user annotated subscription media content. The method may include: decrypting the subscribed media content received from a content server; playing the decrypted subscribed media content to a display element of a user device; receiving a snapshot request from the user, the snapshot associated with a frame of the decrypted subscribed media content; receiving annotation information from the user; generating an overlay image based on the annotation information; encrypting a composite image of the overlay image and the snapshot; and sharing the encrypted composite image with other users.

Example 24 may include the subject matter of Example 23, and the annotation information includes one or more of text, drawings, labels and pictures.

Example 25 may include the subject matter of any of Examples 23 and 24, further including receiving a content encryption key for the subscribed media from a license server based on an authentication of the user device.

Example 26 may include the subject matter of any of Examples 23-25, and the decrypting of the subscribed media content is based on the content encryption key.

Example 27 may include the subject matter of any of Examples 23-26, and the encrypting of the composite image is based on the content encryption key.

Example 28 may include the subject matter of any of Examples 23-27, and the sharing further includes transmitting the encrypted composite image over a network.

Example 29 may include the subject matter of any of Examples 23-28, and the snapshot request is received during real-time playing of the media content, during a rewind search of the media content, during a fast forward search of the media content or during a pause of the media content.

Example 30 may include the subject matter of any of Examples 23-29, and the playing further includes streaming the decrypted subscribed media content to a computing device or mobile platform.

Example 31 may include the subject matter of any of Examples 23-30, and the overlay image further includes metadata associated with the playing of the decrypted media content, the metadata indicating one of real-time play, rewind, fast forward or pause.

According to Example 32 there is provided a system for secure sharing of user annotated subscription media content. The system may include: means for decrypting the subscribed media content received from a content server; means for playing the decrypted subscribed media content to a display element of a user device; means for receiving a snapshot request from the user, the snapshot associated with a frame of the decrypted subscribed media content; means for receiving annotation information from the user; means for generating an overlay image based on the annotation information; means for encrypting a composite image of the overlay image and the snapshot; and means for sharing the encrypted composite image with other users.

Example 33 may include the subject matter of Example 32, and the annotation information includes one or more of text, drawings, labels and pictures.

Example 34 may include the subject matter of any of Examples 32 and 33, further including means for receiving a content encryption key for the subscribed media from a license server based on an authentication of the user device.

Example 35 may include the subject matter of any of Examples 32-34, and the decrypting of the subscribed media content is based on the content encryption key.

Example 36 may include the subject matter of any of Examples 32-35, and the encrypting of the composite image is based on the content encryption key.

Example 37 may include the subject matter of any of Examples 32-36, and the sharing further includes means for transmitting the encrypted composite image over a network.

Example 38 may include the subject matter of any of Examples 32-37, and the snapshot request is received during real-time playing of the media content, during a rewind search of the media content, during a fast forward search of the media content or during a pause of the media content.

Example 39 may include the subject matter of any of Examples 32-38, and the playing further includes means for streaming the decrypted subscribed media content to a computing device or mobile platform.

Example 40 may include the subject matter of any of Examples 32-39, and the overlay image further includes metadata associated with the playing of the decrypted media content, the metadata indicating one of real-time play, rewind, fast forward or pause.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for secure sharing of user annotated subscription media content, said system comprising:
 a host processor configured to arrange a secure session with a subscription media server and to receive encrypted subscription media content from said server;
 a first trusted execution environment (TEE) comprising a secure processor and secure storage, wherein said first TEE is configured to decrypt said encrypted subscription media content to produce decrypted subscription media content, and to store said decrypted subscription media content in said secure storage, said decryption based on a content encryption key obtained from said server;
 a graphical user interface module configured to receive a snapshot frame request associated with one or more frames of said decrypted subscription media content and configured to receive associated annotation information from a user of said system; and
 a secure graphics engine;
wherein:
 said first TEE is further configured to receive said annotation information, to encrypt said annotation information to produce encrypted annotation information, to encrypt a snapshot frame of said decrypted subscription media content associated with said snapshot frame request to produce an encrypted snapshot frame, and to transmit said encrypted annotation information and said encrypted snapshot frame to said secure graphics engine via a secure channel between the first TEE and the secure graphics engine; and
 the secure graphics engine is configured to:
  decrypt said encrypted snapshot frame to obtain said snapshot frame;
  decrypt said encrypted annotation information to obtain said annotation information;
  generate a composite image comprising said snapshot frame and an overlay image by directly overlaying said overlay image with said snapshot frame, wherein said overlay image is based on said annotation information; and
  encrypt said composite image for sharing with other users.

2. The system of claim 1, wherein the secure graphics engine comprises a second TEE, and the secure graphics engine is configured to decrypt said encrypted snapshot frame within said second TEE to obtain said snapshot frame within said second TEE, decrypt said encrypted annotation information within said second TEE to obtain said annotation information within said second TEE, generate said composite image within said second TEE and encrypt said composite image within said second TEE.

3. The system of claim 1, wherein said host processor is further configured to share said encrypted composite image with other users.

4. The system of claim 3, wherein said sharing further comprises said host processor configured to transmit said encrypted composite image over a network.

5. The system of claim 1, wherein said annotation information comprises one or more of text, drawings, labels and pictures.

6. The system of claim 1, wherein said encryption of said composite image is based on said content encryption key.

7. The system of claim 2, wherein said secure graphics engine is further configured to receive said user specified frame during real-time playing of said decrypted media content, during a rewind search of said decrypted media content, during a fast forward search of said decrypted media content or during a pause of said decrypted media content.

8. The system of claim 2, wherein said overlay image further comprises metadata associated with said playing of said decrypted media content, said metadata indicating one of real-time play, rewind, fast forward or pause.

9. The system of claim 1, wherein said secure graphics engine is further configured to stream said decrypted media content to a computing device or mobile platform.

10. The system of claim 1, wherein at least a portion of said system is incorporated in a television system.

11. The system of claim 1, wherein at least a portion of said system is incorporated in a mobile platform.

12. At least one non-transitory computer-readable storage medium having instructions stored thereon which when executed by a processor result in the following operations for secure sharing of user annotated subscription media content, said operations comprising:
 receiving encrypted subscribed media content from a content server;
 decrypting said encrypted subscribed media content within a first trusted execution environment (TEE) comprising a secure processor and secure storage, so as to produce decrypted subscribed media content and store said decrypted subscribed media content within said secure storage, said decrypting being based on a content encryption key;
 playing said decrypted subscribed media content to a display element of a user device;
 receiving a snapshot frame request from a user, said snapshot frame request associated with one or more frames of said decrypted subscribed media content;
 receiving annotation information from said user;
 encrypting, with said first TEE, said annotation information and a snapshot frame associated with said snapshot frame request to produce encrypted annotation information and encrypted annotation information and an encrypted snapshot frame;
 transmitting the encrypted annotation information and the encrypted snapshot frame to a secure graphics engine via a secure channel between the first TEE and the secure graphics engine;
 with the secure graphics engine:
  decrypting said encrypted snapshot frame and said encrypted annotation information to obtain said snapshot frame and said annotation information;
  generating an overlay image based on said annotation information;
  generating a composite image comprising said snapshot frame and said overlay image by directly overlaying said overlay image with said snapshot frame; and
  encrypting said composite image for sharing with others.

13. The non-transitory computer-readable storage medium of claim 12, wherein said annotation information comprises one or more of text, drawings, labels and pictures.

14. The non-transitory computer-readable storage medium of claim 12, further comprising the operation of receiving said content encryption key for said subscribed media content from a license server based on an authentication of said user device.

15. The non-transitory computer-readable storage medium of claim 12, wherein:
said secure graphics engine comprises a second TEE;
decrypting said encrypted snapshot frame and said encrypted annotation information is performed within the second TEE to obtain said annotation information and said snapshot frame within the second TEE;
generating said overlay image and said composite image is performed within the second TEE; and
encrypting said composite image is performed within the second TEE.

16. The non-transitory computer-readable storage medium of claim 14, wherein said encrypting of said composite image is based on said content encryption key.

17. The non-transitory computer-readable storage medium of claim 14, wherein said sharing further comprises the operation of transmitting said encrypted composite image over a network.

18. The non-transitory computer-readable storage medium of claim 12, wherein said snapshot request is received during real-time playing of said media content, during a rewind search of said media content, during a fast forward search of said media content or during a pause of said media content.

19. The non-transitory computer-readable storage medium of claim 12, wherein said playing further comprises the operation of streaming said decrypted subscribed media content to a computing device or mobile platform.

20. The non-transitory computer-readable storage medium of claim 12, wherein said overlay image further comprises metadata associated with said playing of said decrypted media content, said metadata indicating one of real-time play, rewind, fast forward or pause.

21. A method for secure sharing of user annotated subscription media content, said method comprising:
receiving encrypted subscribed media content from a content server;
decrypting said encrypted subscribed media content within a first trusted execution environment (TEE) comprising a secure processor and secure storage, so as to produce decrypted subscribed media content and store said decrypted subscribed media content within said secure storage, said decrypting being based on a content encryption key;
playing said decrypted subscribed media content to a display element of a user device;
receiving a snapshot frame request from a user, said snapshot frame request associated with one or more frames of said decrypted subscribed media content;
receiving annotation information from said user;
encrypting, with said first TEE, said annotation information and a snapshot frame associated with said snapshot frame request to produce encrypted annotation information and encrypted annotation information and an encrypted snapshot frame;
transmitting the encrypted annotation information and the encrypted snapshot frame to a secure graphics engine via a secure channel between the first TEE and the secure graphics engine;
with the secure graphics engine:
decrypting said encrypted snapshot frame and said encrypted annotation information to obtain said snapshot frame and said annotation information;
generating an overlay image based on said annotation information;
generating a composite image comprising said snapshot frame and said overlay image by directly overlaying said overlay image with said snapshot frame; and
encrypting said composite image for sharing with others.

22. The method of claim 21, wherein said annotation information comprises one or more of text, drawings, labels and pictures.

23. The method of claim 21, further comprising receiving said content encryption key for said subscribed media content from a license server based on an authentication of said user device.

24. The method of claim 21, wherein:
said secure graphics engine comprises a second TEE;
decrypting said encrypted snapshot frame and said encrypted annotation information is performed within the second TEE to obtain said annotation information and said snapshot frame within the second TEE;
generating said overlay image and said composite image is performed within the second TEE; and
encrypting said composite image is performed within the second TEE.

25. The method of claim 23, wherein said encrypting of said composite image is based on said content encryption key.

26. The method of claim 23, wherein said sharing further comprises transmitting said encrypted composite image over a network.

27. The method of claim 21, wherein said snapshot request is received during real-time playing of said media content, during a rewind search of said media content, during a fast forward search of said media content or during a pause of said media content.

28. The method of claim 21, wherein said playing further comprises streaming said decrypted subscribed media content to a computing device or mobile platform.

29. The method of claim 21, wherein said overlay image further comprises metadata associated with said playing of said decrypted media content, said metadata indicating one of real-time play, rewind, fast forward or pause.

* * * * *